US010649765B2

(12) United States Patent
Kludy

(10) Patent No.: US 10,649,765 B2
(45) Date of Patent: *May 12, 2020

(54) SYSTEMS AND METHODS FOR PREVENTING SERVICE DISRUPTION DURING SOFTWARE UPDATES

(71) Applicant: Citrix Systems, Inc., Fort Lauderdale, FL (US)

(72) Inventor: Thomas Kludy, Fort Lauderdale, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/196,159

(22) Filed: Nov. 20, 2018

(65) Prior Publication Data

US 2019/0087177 A1    Mar. 21, 2019

Related U.S. Application Data

(63) Continuation of application No. 15/619,052, filed on Jun. 9, 2017, now Pat. No. 10,191,732.

(51) Int. Cl.
| | | |
|---|---|---|
| *G06F 9/44* | (2018.01) | |
| *G06F 8/658* | (2018.01) | |
| *G06F 9/48* | (2006.01) | |
| *H04L 12/24* | (2006.01) | |
| *H04L 29/08* | (2006.01) | |
| *G06F 8/65* | (2018.01) | |

(Continued)

(52) U.S. Cl.
CPC .............. *G06F 8/658* (2018.02); *G06F 8/65* (2013.01); *G06F 9/4401* (2013.01); *G06F 9/4406* (2013.01); *G06F 9/4881* (2013.01); *G06F 9/5072* (2013.01); *H04L 41/082* (2013.01); *H04L 67/10* (2013.01)

(58) Field of Classification Search
CPC .................................... G06F 8/658; G06F 8/71
USPC ................. 717/165–174, 101–103, 108–110, 717/120–123
See application file for complete search history.

(56) References Cited

U.S. PATENT DOCUMENTS 5,919,247 A * 7/1999 Van Hoff .................. G06F 8/61
707/999.201
6,167,567 A * 12/2000 Chiles ..................... G06F 9/454
717/173

(Continued)

OTHER PUBLICATIONS

Wahler et al, "Disruption-free Software Updates in Automation Systems", IEEE, pp. 1-8 (Year: 2014).*

(Continued)

*Primary Examiner* — Anil Khatri
(74) *Attorney, Agent, or Firm* — Fox Rothschild LLP; Robert J. Sacco; Carol E. Thorstad-Forsyth

(57) ABSTRACT

Systems and methods for preventing service disruptions in a computing system. The methods comprise: receiving, at a cloud-based computing system, messages for initiating software updates requiring system reboots by remote computing machines; and performing operations by the cloud-based computing system to cause an operational state of only one remote computing machine to be transitioned from an online state to an offline state at any given time by scheduling the software updates and system reboots in a one-machine-at-a-time manner.

20 Claims, 4 Drawing Sheets

(51) Int. Cl.
    *G06F 9/4401* (2018.01)
    *G06F 9/50* (2006.01)

(56) References Cited

U.S. PATENT DOCUMENTS

| | | | | |
|---|---|---|---|---|
| 6,202,207 | B1* | 3/2001 | Donohue | G06F 8/65 |
| | | | | 705/59 |
| 6,226,747 | B1* | 5/2001 | Larsson | G06F 21/105 |
| | | | | 360/60 |
| 6,282,712 | B1* | 8/2001 | Davis | G06F 8/60 |
| | | | | 704/8 |
| 6,490,722 | B1* | 12/2002 | Barton | G06F 11/1417 |
| | | | | 348/E5.103 |
| 6,986,133 | B2* | 1/2006 | O'Brien | G06F 8/65 |
| | | | | 717/173 |
| 7,191,438 | B2 | 3/2007 | Bryant | |
| 7,509,636 | B2 | 3/2009 | McGuire et al. | |
| 7,546,594 | B2 | 6/2009 | McGuire et al. | |
| 7,546,595 | B1* | 6/2009 | Wickham | G06F 8/65 |
| | | | | 717/168 |
| 7,574,481 | B2 | 8/2009 | Moore et al. | |
| 7,584,467 | B2* | 9/2009 | Wickham | G06F 8/65 |
| | | | | 717/171 |
| 7,590,653 | B2* | 9/2009 | Sparks | H04L 41/12 |
| 8,185,884 | B2 | 5/2012 | Sudhakar | |
| 8,266,616 | B1* | 9/2012 | Jacquot | G06F 8/65 |
| | | | | 717/121 |
| 8,296,756 | B1* | 10/2012 | Feeser | G06F 8/658 |
| | | | | 717/173 |
| 8,407,683 | B2 | 3/2013 | Cheng et al. | |
| 8,505,003 | B2 | 8/2013 | Bowen | |
| 8,505,005 | B1* | 8/2013 | Bos | G06F 8/61 |
| | | | | 717/177 |
| 8,521,853 | B2 | 8/2013 | Rathunde et al. | |
| 8,522,228 | B1* | 8/2013 | Le | G06F 8/61 |
| | | | | 717/168 |
| 8,527,977 | B1 | 9/2013 | Cheng et al. | |
| 8,544,007 | B2* | 9/2013 | Al-Aziz | H04L 67/02 |
| | | | | 717/168 |
| 8,612,398 | B2 | 12/2013 | Jarrett et al. | |
| 8,713,098 | B1 | 4/2014 | Adya et al. | |
| 8,780,655 | B1 | 7/2014 | Kumar et al. | |
| 8,825,795 | B2 | 9/2014 | Wesley, Sr. et al. | |
| 8,887,144 | B1* | 11/2014 | Marr | G06F 8/65 |
| | | | | 717/168 |
| 8,893,114 | B1* | 11/2014 | Cooley | G06F 8/66 |
| | | | | 717/168 |
| 9,003,389 | B2* | 4/2015 | Vidal | G06F 8/453 |
| | | | | 717/168 |
| 9,026,908 | B2* | 5/2015 | Wagner | G06F 8/71 |
| | | | | 715/229 |
| 9,038,048 | B2 | 5/2015 | Yang et al. | |
| 9,038,060 | B2* | 5/2015 | Chan | H04L 67/34 |
| | | | | 717/174 |
| 9,405,526 | B2 | 8/2016 | Thapar et al. | |
| 9,798,534 | B1* | 10/2017 | Yi | G06F 11/1076 |
| 9,983,988 | B1* | 5/2018 | Quadros | G06F 11/3692 |
| 10,223,104 | B2* | 3/2019 | Rees | G06F 8/71 |
| 10,289,401 | B1* | 5/2019 | Gerraty | G06F 9/4406 |
| 10,387,139 | B2* | 8/2019 | Fox | G06F 11/0721 |
| 2009/0144720 | A1 | 6/2009 | Roush et al. | |
| 2010/0293541 | A1 | 11/2010 | Pall et al. | |
| 2013/0067454 | A1 | 3/2013 | Thompson et al. | |
| 2016/0026453 | A1 | 1/2016 | Zhang et al. | |

OTHER PUBLICATIONS

Arnold et al, "Ksplice: Automatic Rebootless Kernel Updates", ACM, pp. 187-198 (Year: 2009).*
Vaniea et al, "Tales of Software Updates: The process of updating software", ACM, pp pp. 3215-3226 (Year: 2016).*
Zhou et al, "Fast Hypervisor Recovery Without Reboot", IEEE, pp. 115-126 (Year: 2018).*
Bhattacharya et al, "Dynamic Updates for Web and Cloud Applications", ACM, pp. 21-35 (Year: 2010).*
Wahler et al, "Dynamic Software Updates for Real-Time Systems", ACM, pp. 1-6 (Year: 2009).*
Harada et al, "Dynamic software updating of OLTs without service interruption", IEEE, pp. 1-5 (Year: 2017).*
Li, et al., "Consistency Aware Update Schedule in Multi-Server Distributed virtual Environments," ACM, pp. 1-8, 2010.
Subramaniam et al., "Dynamic Software Updates: A VM-centric Approach," ACM, pp. 1-12, 2009.
Bhattachayra, et al., "Dynamic Updates for Web and Cloud Applications," ACM, pp. 24-25, 2010.
Lu, et al., "VM Image Update Notification Mechanism Based on Pub/Sub Paradigm in Cloud," ACM, pp. 1-4, 2013.
Laszewski, et al., "Accessing Multiple Clouds with Cloudmesh," ACM, pp. 21-28, 2014.
Platen, et al., "Feedback Linking Optimizing Ojbect Code Layout for Updates," ACM, pp. 2-11, 2006.

* cited by examiner

SYSTEMS AND METHODS FOR PREVENTING SERVICE DISRUPTION DURING SOFTWARE UPDATES

CROSS REFERENCE TO RELATED APPLICATION

The present application is a continuation application of U.S. application Ser. No. 15/619,052, filed on Jun. 9, 2017. The entirety of this application is incorporated herein by reference.

BACKGROUND

Statement of the Technical Field

The present disclosure relates generally to computing systems. More particularly, the present disclosure relates to implementing systems and methods preventing service disruption during software (e.g., operating system) updates.

Description of the Related Art

As part of Citrix® Cloud, a customer deploys two or more connectors per resource location. Each connector is a Windows®-based machine. A resource location is a collection of related resources (including related machines) that a customer manages. The connector allows the cloud-hosted services in Citrix® Cloud to access the resources inside of the resource location. The connectors in a resource location are considered to be part of a single "availability set" (meaning, the connectors are able to provide full functionality without any outages, as long as no more than one connector in the resource location is offline at any point in time).

Citrix® Cloud coordinates maintenance activities across connectors in a way that ensures that any maintenance operation (defined as: any operation with a potential to cause a service disruption) happens on only a single connector at a time, and that maintenance operations do not happen on a connector while the connector is actively processing a task.

However, as part of best practices of running a machine (any kind of machine), it is necessary to keep the machine patched and up to date with the latest security fixes. These patches frequently require the machine to reboot or have some other temporary service disruption, lasting anywhere from five (5) minutes to one (1) hour. The patches are typically distributed to the machine directly from the Operating System ("OS") vendor.

A first problem occurs because the OS distributes the patches directly to the machine, without any knowledge of the machine being in a state that is ready to apply the patch. Typically, the OS will apply the patch immediately, prematurely terminating tasks that the connector is currently executing.

A second problem occurs because when an OS vendor releases a security patch, all machines apply the patch at roughly the same time. Since the security patches cause a temporary downtime, having more than one machine apply the patch at the same time will violate the principal of the availability set (that at most one machine in the set can be offline at any given time) and cause an outage of the entire service.

SUMMARY

Implementing systems and methods are described herein for preventing service disruptions in a computing system. The methods comprise: receiving, at a cloud-based computing system, a plurality of messages for initiating software updates requiring system reboots by a plurality of remote computing machines; and performing operations by the cloud-based computing system to cause an operational state of only one remote computing machine of the plurality of remote computing machines to be transitioned from an online state to an offline state at any given time by scheduling the software updates and system reboots in a one-machine-at-a-time manner. The scheduling is made based on at least one of a load of a remote computing machine, an operational capacity of the remote computing machine, a type of operations being performed by the remote computing machine, a time of day, an operational state of the remote computing machine, and a state of connectivity of the plurality of remote computing machines.

In some scenarios, the software updates and system reboots for the plurality of remote computing machines are scheduled in an order that is different than or the same as an order in which the messages were received by the cloud-based computing system. The operational state of the remote computing machine is transitioned from the online state to the offline state in response to the remote computing machine's retrieval of a respective message of the plurality of messages from the cloud-based computing system. The operational state of the remote computing machine is transitioned from the offline state to the online state when the remote computing machine completes a system reboot.

In those or other scenarios, the cloud-based computing system receives a notification indicating that a first one of the plurality of remote computing machines has completed a first software update and first system reboot. In response to the notification, the cloud-based computing system performs operations to initiate a second software update and a second system reboot at a second one of the plurality of remote computing machines.

In those or other scenarios, a first machine performs operations to determine if a first software update is needed that requires a first system reboot. The first machine automatically schedules the first software update if the first software update does not require the first system reboot. In contrast, the first machine communicates a first message of the plurality of messages to the cloud-based computing system if the first software update does require the first system reboot.

BRIEF DESCRIPTION OF THE DRAWINGS

Embodiments will be described with reference to the following drawing figures, in which like numerals represent like items throughout the figures.

DETAILED DESCRIPTION

Figure 1:
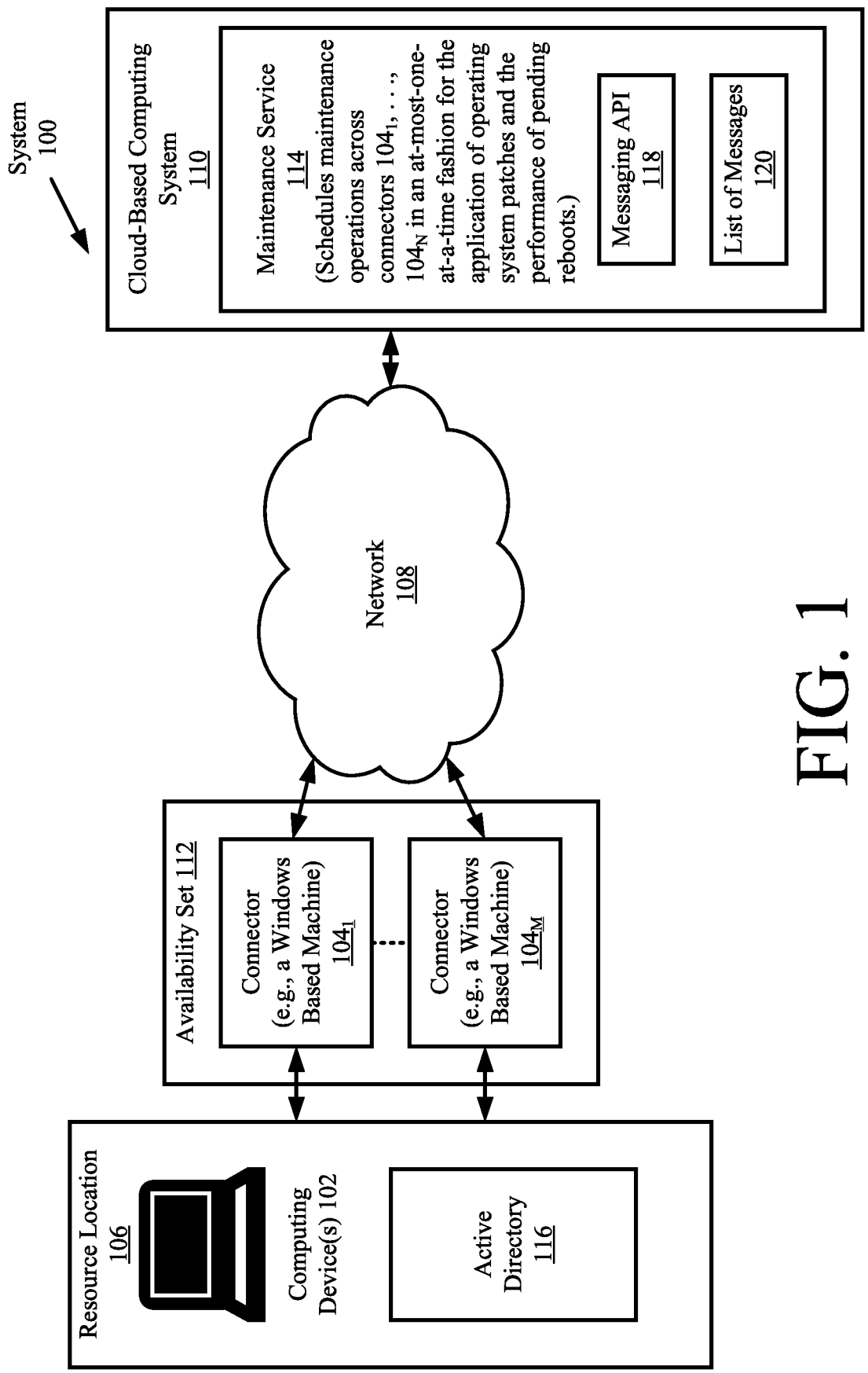
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meaning as commonly understood by one of ordinary skill in the art. As used in this document, the term "comprising" means "including, but not limited to".

Referring now to FIG. 1, there is provided an illustration of an exemplary system 100. System 100 is configured to use a maintenance service 114 hosted by a cloud-based computing system 110 to facilitate the coordination of the application of software (e.g., OS) updates so that only a single connector $104_1, \ldots, 104_M$ in an availability set 112 will receive updates at the same time. In this way, updates (and corresponding temporary outages) are coordinated across independent connectors $104_1, \ldots, 104_M$ that act as part of an availability set 112. No two (2) connectors $104_1, \ldots, 104_M$ in the availability set 112 apply updates at the same time.

Connectors are well known in the art, and therefore will not be described in detail herein. In some scenarios, each connector $104_1, \ldots, 104_M$ is a Windows®-based machine (e.g., a server). Each connector $104_1, \ldots, 104_M$ is installed to facilitate the administration and control of resource locations from the cloud-based computing system 110. Accordingly, each connector $104_1, \ldots, 104_M$ serves as a channel for communication between the cloud-based computing system 110 and the resource location 106 enabling cloud management without requiring complex networking or infrastructure configurations. Each connector $104_1, \ldots, 104_M$ authenticates and encrypts all communication between the cloud-based computing system 110 and the resource location 106. All communications between the connectors $104_1, \ldots, 104_M$ and the cloud-based computing system 110 are outbound. During operations, each connector $104_1, \ldots, 104_M$ performs functions to enable: Active Directory ("AD") management; publishing from resources in the resource location 106; application and device management; user group management; and machine provisioning to the resource location 106.

As shown in FIG. 1, M connectors are deployed for a resource location 106. M is an integer value equal to or greater than two (2), i.e., two (2) or more connectors are deployed per resource location 106. Two or more connectors are employed to provide relatively high availability and relatively high throughput. A single connector cannot provide this. For example, if there is only one connector and it goes offline, then the connectivity with the cloud-based computing system 110 would be lost and the service would cease functioning.

The resource location 106 comprises a collection of resources that the customer (or company) manages. The resources can include, but are not limited to, computing device(s) 102 and/or an AD 116. Computing devices and ADs are well known in the art, and therefore will not be described herein. Any known or to be known computing device and/or AD can be used herein without limitation. For example, the computing device 102 includes, but is not limited to, a desktop computer, a personal computer, a personal digital assistant, a laptop computer, and/or a smart phone. The AD 116 includes, but is not limited to, a single-tenant AD (such as Microsoft® AD). The AD 116 provides identifying information for a customer's employees. The identifying information can include, but is not limited to, Security Identifiers ("SIDs").

The present solution combines the ability of a cloud-hosted maintenance service 114 (e.g., a Citrix Cloud service) 110 to schedule maintenance operations across connectors $104_1, \ldots, 104_M$ in an at-most-one-machine-at-a-time fashion for the application of software (e.g., OS) patches and the performance of pending reboots. The security patch application is scheduled through the cloud-hosted maintenance service 114 rather than via the control of the OS (as is done in conventional systems). Each connector $104_1, \ldots, 104_M$ periodically monitors itself to determine (a) if either a security patch exists that needs to be applied or (b) if a security patch has been automatically applied and a reboot is pending. If a reboot is pending, the connector $104_1, \ldots, 104_M$ sends a maintenance message to itself through the cloud-hosted maintenance service 114. The cloud-hosted maintenance service 114 then sequences the maintenance message across different connectors, ensuring that (a) only a single connector processes the security patch at a time and (b) the maintenance message is not delivered to a connector until the connector has completed any long-running tasks. The messaging is facilitated by a messaging Application Programming Interface ("API") 118 of the maintenance service 114. APIs are well known in the art, and therefore will not be described herein.

The present solution can be used for any situation where a machine needs to perform an operation that could cause a disruption of service on the local machine. The present solution provides a means to execute the operation in a one-machine-at-a-time mode across multiple machines within the larger service context. For example, if a machine detects that it needs to switch modes of operation but doing so would cause a temporary outage, the same process can be used to coordinate the switching of modes without causing a service outage. The present solution can also be used to handle application updates, virus scanner updates, and other updating operations that put the machine into a "pending reboot" state. The present solution ensures that these updates are applied quickly with no overall service downtime.

There are various conventional solutions for scheduling reboots across multiple machines. However, these conventional solutions do not take into account long-running operations, and typically require manual configuration to schedule reboots based on a staggered time schedule. The present solution does not rely on any time schedule such that reboots happen as soon as possible in a one-machine-at-a-time manner. The conventional solutions are typically under direct customer control and cannot be controlled from a cloud service. The conventional solutions can only provide a reboot capability, or in some cases software distribution services. The present solution can be used for any operation that could cause a temporary downtime on the local system.

Figure 2:
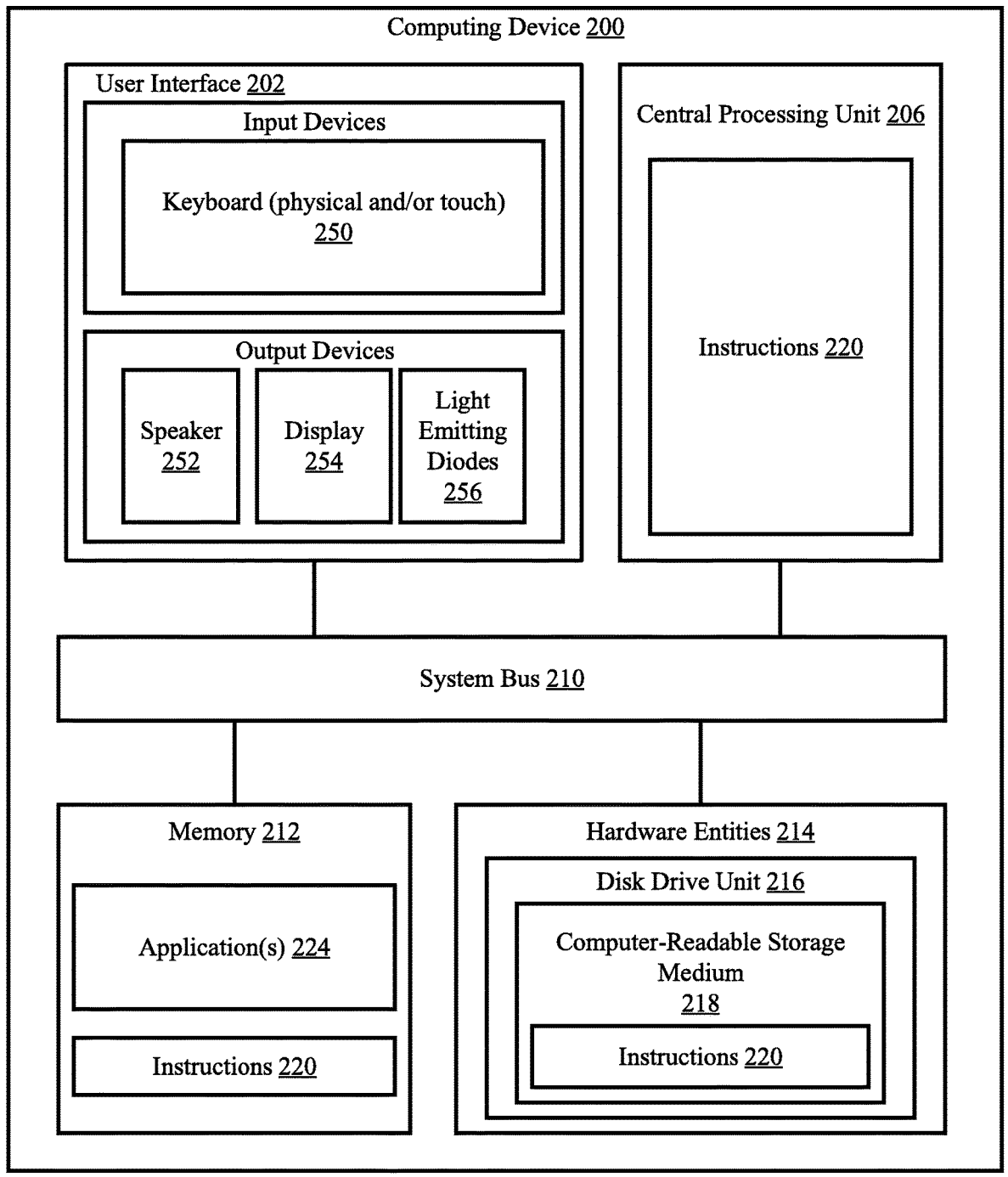
FIG. 2 is an illustration of an exemplary architecture for a computing device.

Referring now to FIG. 2, there is provided an illustration of an exemplary computing device 200 hosting a maintenance service (e.g., maintenance service 114 of FIG. 1). In this regard, the computing device 200 is part of a cloud-based computing system (e.g., cloud-based computing system 110 of FIG. 1). The cloud-based computing system can include a plurality of servers arranged in a distributed fashion. Each server is the same as or substantially similar to computing device 200.

Notably, the connectors $104_1, \ldots, 104_M$ of FIG. 1 can have the same or similar architecture as that shown in FIG. 2. As such, the description of FIG. 2 is also suitable for understanding the hardware and/or software architectures of the connectors of FIG. 1. As noted above, the connectors $104_1, \ldots, 104_M$ of FIG. 1 can include, but are not limited to, machines (or computing devices) running a Windows OS (e.g., a personal computer or server). Such machines (or computing devices) are well known in the art, and will not be described in detail herein. Still, it should be understood that such machines are modified to implement all or a portion of the methods described herein. Such modifications can include software modifications, hardware modification or a combination of both.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to enable the prevention of service disruptions during operating system updates as described herein. As such, the computing device 200 of FIG. 2 implements at least a portion of the method(s) described herein.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256.

At least some of the hardware entities 214 perform actions involving access to and use of memory 212, which can be a Radom Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

In some scenarios, the hardware entities 214 include an electronic circuit (e.g., a processor) programmed for facilitating the prevention of service disruptions during operating system updates. In this regard, it should be understood that the electronic circuit can access and run application(s) 224 installed on the computing device 200. The functions of the software application(s) 224 are apparent from the following discussion of the present solution. For example, the software application is configured to perform one or more of the operations described below in relation to FIGS. 3-4.

Referring now to FIG. 3, there is provided a flow diagram of an exemplary method 300 for preventing service disruption during operating system updates. Method 300 provides a way to ensure that only one connector goes offline at any given time as a result of software updates and reboots. In this regard, the software updating and rebooting by a plurality of connectors is serialized. From a customer perspective, the connectors are more of a black box that does not have to be managed thereby. A cloud-based computing system remotely manages when all software updates and reboots are to take place without any customer assistance and/or without any connector outages (i.e., all connectors are offline at the same time).

The manner in which the software updates and rebooting are performed by each connector is determined based on the OS technique employed thereby. For example, the software updates are achieved in accordance with a conventional OS technique. The OS has a built-in automatic software update feature. The OS built-in automatic software update feature is well known in the art, and therefore will not be described herein. Any known or to be known OS built-in automatic software update feature can be used herein without limitation. Similarly, boot sequences are well known in the art. Any known or to be known booting process can be employed herein without any limitation.

Figure 3A:
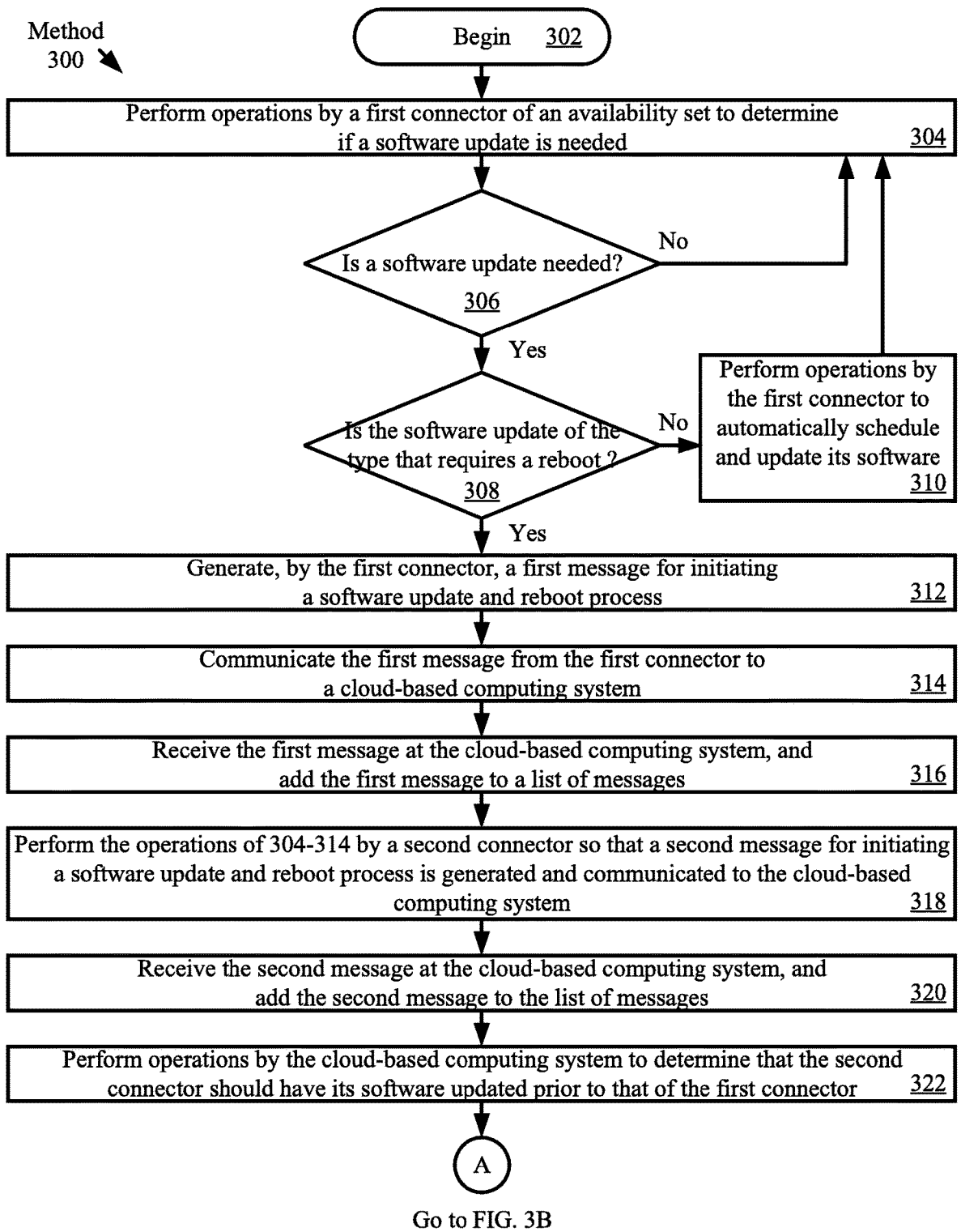
FIGS. 3A-3B (collectively referred to herein as "FIG. 3") is a flow diagram of an exemplary method for preventing service disruption during operating system updates.

As shown in FIG. 3A, method 300 begins with 302 and continues with 304 where a first connector (e.g., connector $104_1$ of FIG. 1) of an availability set (e.g., availability set 112 of FIG. 1) performs operations to determine if a software update is needed. If a software update is needed [306:YES], then the first connecter determines whether the software update is of a type that requires rebooting thereof. If not [308:NO], then the first connector automatically performs the software updates in 310. Thereafter, method 400 returns to 304. If so [308:YES], then 312 is performed where the first connector generates a first message for initiating a software update and reboot process. The first message is communicated from the first connector to a cloud-based computing system (e.g., cloud-based computing system 110 of FIG. 1), as shown by 314. In 316, the first message is received at the cloud-based computing system and added to a list of messages (e.g., list 120 of FIG. 1).

As shown by 318, the operations of 304-314 are also performed by a second connector (e.g., connector $104_M$ of FIG. 1). As a result, the second connector generates a second message for initiating a software update and reboot process. The second message is then communicated from the second connector to the cloud-based computing system. In 320, the second message is received at the cloud-based computing system and added to the list of messages.

Next in 322, the cloud-based computing system performs operations to determine that the second connector should have its software updated prior to that of the first connector. Notably, the order of which connectors update their software can be the same as or different than the order in which the messages are received at the cloud-based computing system. Here, for explanation purposes only, the second connector is to have its software updated prior to that of the first connector even though the cloud-based computing system received the second message after the first message.

The determination of 322 can be made based on various parameters selected in accordance with a particular application. The parameters include, but are not limited to, connector load, connector operational capacity, type of operations being performed by the connector (e.g., a long running operation that cannot be interrupted as opposed to a short running application), time of day, connector operational state (e.g., online or offline), and/or state of connectivity of all connectors (e.g., number of offline connectors versus number of online connectors, or whether the number of online connectors exceeds a threshold value (e.g., 2)).

Figure 3B:
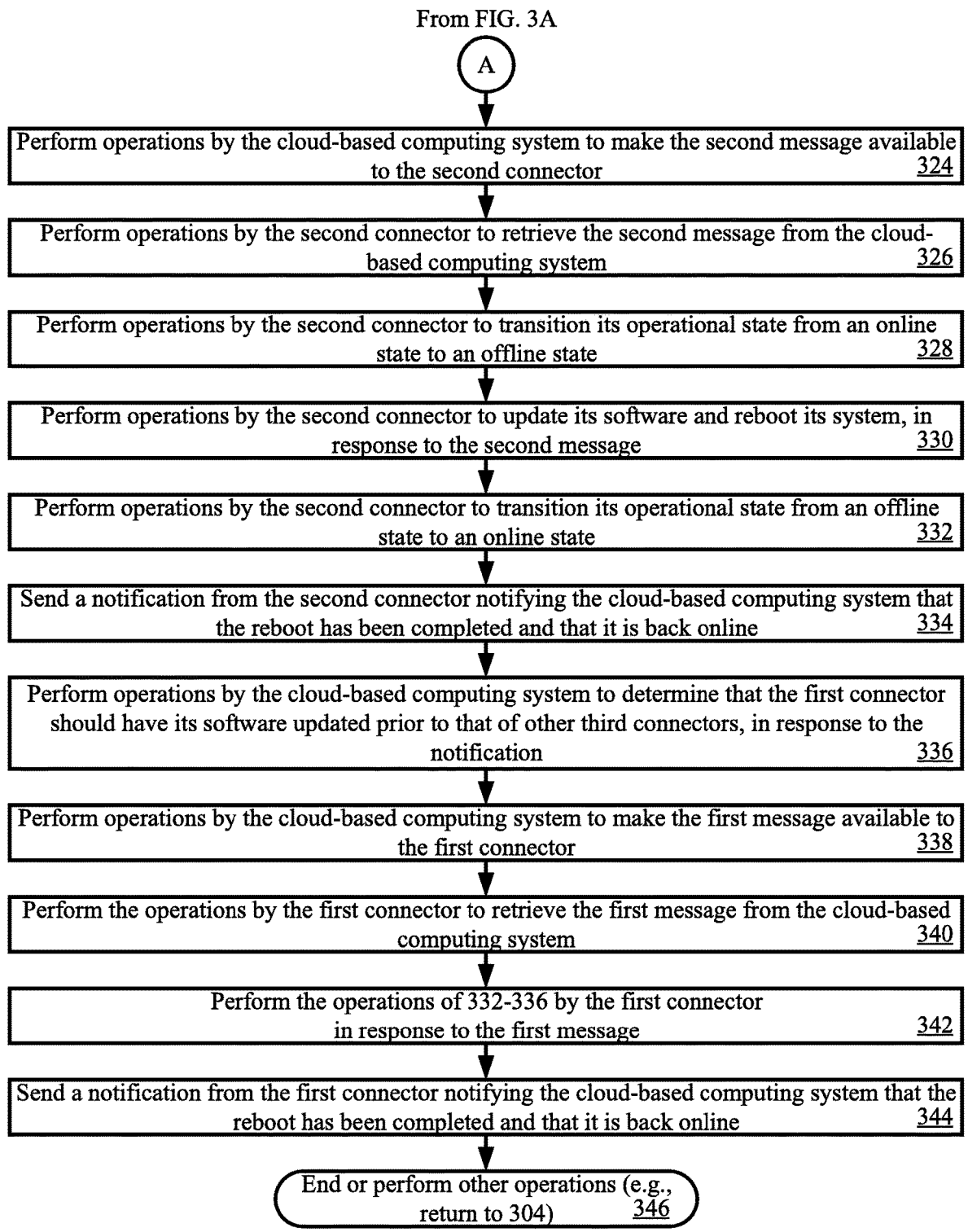

Referring now to FIG. 3B, method 300 continues with 324 where the cloud-based computing system performs operations to make the second message available to the second connector. In 326, the second connector retrieves the second message from the cloud-based computing system. The second message triggers a software update and rebooting process at the second connector. Accordingly, the second connector transitions its operational state from an online state to an offline state as shown by 328. The second connector then performs operations in 330 to update its software in accordance with an OS built-in automatic software update feature. The second connector is also rebooted. Once rebooted, the operational state of the second connector is transitioned from the offline state to the online state, as shown by 332. Thereafter in 334, a notification is sent from the second connector notifying the cloud-based computing system that the reboot has been completed and that it is back online. In response to the notification, the second connector performs operations to determine that the first connector should now have its software updated prior to that of other third connectors, as shown by 336. At this time, the cloud-based computing system makes the first message available to the first connector, as shown by 338. Next in 340, the first connector retrieves the first message from the cloud-based computing system. In response to the first message, the first connector performs the operations of 332-336. Upon completing these operations, the first connector notifies the cloud-based computing system that it has completed its software update and rebooting. Subsequently, 346 is performed where method 300 ends or other processing is performed.

In view of the forgoing, the present solution provides a system in which: a connector detects that the machine has a patch and/or reboot pending; the connector sends itself a message through a cloud service (e.g., maintenance server 110 of FIG. 1) to perform the patch and/or reboot; a cloud service that determines the best time to send the patch and/or reboot message to the respective connector by (a) examining the state of whether the machine is currently executing a long-running task and/or (b) checking whether any other machine is in maintenance mode (thus, the current machine should not process any messages that could result in a service disruption). In some scenarios, message are only delivered to the machine if it is in maintenance mode, or if the machine can be put into maintenance mode without impacting the overall service availability.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for preventing service disruptions in a computing system, comprising:

receiving, at a server, a plurality of messages for initiating software updates requiring system reboots by each of a plurality of client machines, where each message is sent by a respective one of the client machines to a maintenance service hosted by the server; and performing operations by the server to schedule maintenance operations by the maintenance service across the plurality of client machines by sequencing availability of the plurality of messages to the client machines, whereby only one client machine of the plurality of client machines is transitioned from an online state to an offline state at any given time.

2. The method according to claim 1, wherein the maintenance operations are scheduled based on at least one of a load of a client machine, an operational capacity of the client machine, a type of operations being performed by the client machine, a time of day, an operational state of the client machine, and a state of connectivity of the plurality of client machines.

3. The method according to claim 1, wherein the software updates and system reboots for the plurality of client machines are scheduled in an order that is different than an order in which the messages were received by the server.

4. The method according to claim 1, wherein the software updates and system reboots for the plurality of client machines are scheduled in an order that is the same as an order in which the messages were received by the server.

5. The method according to claim 1, wherein the operational state of the client machine is transitioned from the online state to the offline state in response to the client machine's retrieval of a respective message of the plurality of messages from the server.

6. The method according to claim 1, wherein the operational state of the client machine is transitioned from the offline state to the online state when the client machine completes a system reboot.

7. The method according to claim 1, further comprising:
receiving, at the server, a notification indicating that a first one of the plurality of client machines has completed a first software update and first system reboot; and
in response to the notification, performing operations by the server to initiate a second software update and a second system reboot at a second one of the plurality of client machines.

8. The method according to claim 1, further comprising performing operations by a first machine of the plurality of client machines to determine if a first software update is needed that requires a first system reboot.

9. The method according to claim 8, further comprising automatically scheduling the first software update by the first machine if the first software update does not require the first system reboot.

10. The method according to claim 8, further comprising communicating a first message of the plurality of messages from the first machine to the server if the first software update does require the first system reboot.

11. A server, comprising:
a processor; and
a non-transitory computer-readable storage medium comprising programming instructions that are configured to cause the processor to implement a method for preventing service disruptions in the server, wherein the programming instructions comprise instructions to:
receive a plurality of messages for initiating software updates requiring system reboots by each of a plurality of client machines, where each message is sent by a respective one of the client machines to a maintenance service hosted by the server; and
schedule maintenance operations by the maintenance service across the plurality of client machines by sequencing availability of the plurality of messages to the client machines, whereby only one client machine of the plurality of client machines is transitioned from an online state to an offline state at any given time.

12. The server according to claim 11, wherein the maintenance operations are scheduled based on at least one of a load of a client machine, an operational capacity of the client machine, a type of operations being performed by the client machine, a time of day, an operational state of the client machine, and a state of connectivity of the plurality of client machines.

13. The server according to claim 11, wherein the software updates and system reboots for the plurality of client machines are scheduled in an order that is different than an order in which the messages were received by the server.

14. The server according to claim 11, wherein the software updates and system reboots for the plurality of client machines are scheduled in an order that is the same as an order in which the messages were received by the server.

15. The server according to claim 11, wherein the operational state of the client machine is transitioned from the online state to the offline state in response to the client machine's retrieval of a respective message of the plurality of messages from the server.

16. The server according to claim 11, wherein the operational state of the client machine is transitioned from the offline state to the online state when the client machine completes a system reboot.

17. The server according to claim 11, wherein the programming instructions comprise instructions to:
receive a notification indicating that a first one of the plurality of client machines has completed a first software update and first system reboot; and
cause a second software update and a second system reboot to be initiated at a second one of the plurality of client machines, in response to the notification.

18. The server according to claim 11, wherein a first machine of the plurality of client machines is configured to determine if a first software update is needed that requires a first system reboot.

19. The server according to claim 18, wherein the first machine automatically schedules the first software update if the first software update does not require the first system reboot.

20. The server according to claim 18, wherein the first machine communicates a first message of the plurality of messages to the server if the first software update does require the first system reboot.

* * * * *